(12) United States Patent  
Sakata et al.

(10) Patent No.: US 7,354,205 B2  
(45) Date of Patent: Apr. 8, 2008

(54) ELECTRO-OPTICAL COMPOSITE CONNECTOR

(75) Inventors: Tsuyoshi Sakata, Tokyo (JP); Takeshi Yamazaki, Tokyo (JP); Kouki Adachi, Tokyo (JP)

(73) Assignee: Hirose Electric Co., Ltd., Tokyo (JP)

( * ) Notice: Subject to any disclaimer, the term of this patent is extended or adjusted under 35 U.S.C. 154(b) by 0 days.

(21) Appl. No.: 11/806,429

(22) Filed: May 31, 2007

(65) Prior Publication Data

US 2007/0280603 A1    Dec. 6, 2007

(30) Foreign Application Priority Data

Jun. 6, 2006   (JP) .............................. 2006-157232

(51) Int. Cl.
G02B 6/36 (2006.01)
(52) U.S. Cl. .............................. 385/92; 385/53; 385/88
(58) Field of Classification Search .................. 385/53, 385/88–92; 439/676; 361/683
See application file for complete search history.

(56) References Cited

U.S. PATENT DOCUMENTS 6,304,436 B1* 10/2001 Branch et al. .............. 361/683
6,942,395 B1* 9/2005 Chuan et al. ................. 385/53
2006/0270283 A1* 11/2006 Kumazawa et al. ........ 439/676

FOREIGN PATENT DOCUMENTS

JP        2006-331741        12/2006

* cited by examiner

*Primary Examiner*—Frank G. Font
*Assistant Examiner*—Michael P. Mooney
(74) *Attorney, Agent, or Firm*—Kubotera & Associates, LLC

(57) ABSTRACT

An electro-optical composite connector includes a receptacle connector including a receptacle housing to be mounted on a first board, a receptacle shell for covering the receptacle housing, and a receptacle terminal arranged on the receptacle housing; and a plug connector including a plug housing for holding an optical fiber, a plug shell for covering the plug housing, and an optical module to be connected to the optical fiber. The optical module includes a second board; a light receiving/emitting element mounted on one surface of the second board; at least one of a plug terminal and a land mounted on the one surface of the second board for transmitting a signal relative to the receptacle terminal; and a grounding surface formed on the other surface of the second board opposite to the one surface. The grounding surface is electrically connected to an inner wall of the plug shell.

16 Claims, 13 Drawing Sheets

ELECTRO-OPTICAL COMPOSITE CONNECTOR

BACKGROUND OF THE INVENTION

1. Field of the Invention

The present invention relates to an electro-optical composite connector. More specifically, the present invention relates to an electro-optical composite connector comprising a plug connector and a receptacle connector.

2. Description of Related Art

Since optical signals are hardly affected by noises in comparison with electrical signals and can transmit a large amount of data at once, the optical signals can be very useful communication method. Since most of devices use electrical signals, there has been developed an electro-optical composite connector that can be used in such a device while taking advantages of the optical signals. The electro-optical composite connector can freely convert between electrical signals and optical signals.

Such an electro-optical composite connector enables signal transmission between, for example, one device that composes a folding-type cellular mobile phone, i.e., a main body having operation keys, and the other device, i.e., a display having a screen. Furthermore, such an electro-optical connector can directly connect the main body to the display. While sizes of devices become smaller, a connector capable of being mounted on a board without increasing a height dimension has been demanded.

FIGS. 22 and 23 show an example of the electro-optical composite connector. The electro-optical composite connector is disclosed in Japanese Patent Application No. 2005-151264. The conventional connector includes a plug connector 102, which is an optical module, and a receptacle connector 104 as a pair. FIG. 22 is a perspective view of the plug connector 102 and the receptacle connector 104 before fitting to each other. FIG. 23 is a cross-sectional perspective view of the plug connector 102 and the receptacle connector 104 after fitting to each other.

The receptacle connector 104 mainly comprises a receptacle connector housing 161; a receptacle shell 160 that covers the receptacle connector housing 161; and connector terminals 140 disposed and secured in the receptacle connector housing 161. The receptacle connector 104 is mounted on a board.

The receptacle connector housing 161 and the receptacle shell 160 of the receptacle connector 104 form a fitting dent 163 to fit the plug connector 102 therein. The plug connector 102 fits into the fitting dent 163 from an upper side thereof. The receptacle connector 104 has an effective fitting length, which is a necessary height for the fitting. When the plug connector 102 fits into the fitting dent 163 of the receptacle connector 104, the plug connector 102 fits completely in the fitting dent 163. At this time, the connector has a substantially complete rectangular shape as a whole.

The front part 142 of the receptacle connector housing 161 has a terminal securing section, where a plurality of connector terminals 140 is arranged along an extending direction of the sidewall 143. Each connector terminal 140 has a shape of two L-shaped pieces jointed horizontally, and mainly comprises three parts, i.e., a contact section 145, a securing section 146, and a section 148 to dispose on a board 110. While the securing sections 146 are positioned vertically, the sections 148 to dispose on the board 110 are positioned horizontally.

Since a part of a bottom surface of the section 148 to dispose on the board 110 transmits electrical signals to/from the board 110, sections to dispose on the board 110 connect to a wiring (not illustrated) on the board 110. The contact sections 145 are arranged vertically, similarly to the securing sections 146, and can contact with the plug terminals 130 in the plug connector 102 at the terminal contact points 141 when the plug connector 102 fits in the receptacle connector 104.

The plug connector 102 mainly includes a plug connector housing 151; a plug shell 150 to cover an outside of the plug connector housing 151; plug terminals 130 arranged and secured inside the plug connector housing 151; and an optical module board 112. Various components, for example, an optical fiber securing base 115; a securing board 116; an optical transducer 120; a wiring 122; an amplifier 118; and on-board wirings 117(a-e) are mounted on the optical module board 112.

A plurality of plug terminals 130 is arranged in several rows at the front part 156 of the plug connector housing 151 corresponding to positions of the connector terminals 140 of the receptacle connector 104. Each plug terminal 130 has substantially E-shape as a whole, and mainly includes a contact section 135; a securing section 136; a middle extending section 137; and a bottom extending section 138.

The contact section 135 is formed of a vertical base. The securing section 136, the middle extending section 137, and the bottom extending section 138 extend in rows from the contact section 135 horizontally to each other. The securing sections 136 secure the plug terminals 130 in the plug connector housing 151. Especially, the middle extending section 137 and the bottom extending section 138 form a space to press a part of the optical module board 112 therein. When the board 112 is pressed in the plug connector housing 151 from a rear side thereof, a part of the board 112, for example, an edge of the board 112 including the on-board wirings 117 on the board surface, is pressed in the space formed by the middle extending section 137 and the bottom extending section 138. Accordingly, the on-board wiring and the board contact point 131 disposed at the end of the extending section 137 electrically and physically contact to each other.

When the plug connector 102 fits to the receptacle connector 104, the plug terminals 130 of the plug connector 102 and the connector terminals 140 of the receptacle connector 104 electrically contact to each other. With this electrical contact, the connector terminals 140 of the receptacle connector 104 electrically connect to the optical transducer 120 of the plug connector 102. By those connections, photoelectric conversion between the plug connector 102 and the receptacle connector 104 is performed while transmitting electric signals.

The above-described conventional connector is useful as the electro-optical composite connector. However, when the plug shell 150 has a hole or a notch to secure a component, electromagnetic waves leak because of a gap made by the hole or the notch, so that the connector requires an additional member to reduce or prevent electromagnetic interference (EMI). In addition, the above-described conventional configuration is difficult to reduce a height of the connector after mounted on a board. More specifically, in the above-described conventional connector, since the middle extending section 137 and the bottom extending section 138 form the space to press a part of the optical module board 112 therein, the connector requires a certain height enough to form the middle extending section 137 and the bottom extending section 138.

The conventional connector has such a configuration because the connector terminals 130 of the plug connector 102 contact with the contact terminals 140 of the receptacle connector 104 by vertically sliding fitting the plug connector 102 so as to fit in the fitting dent 163 of the receptacle connector 104 from the upper side thereof.

In other words, in this vertical fitting method, since the contact between the connector terminals 130 and the contact terminals 140 may become poor, for example, if the plug connector 102 slightly comes off from the board 110, the connector has to have an enough fitting height to prevent the problem. Therefore, it is difficult to reduce the height of the connector after mounted on a board. Furthermore, according to the above-described configuration, in order to connect the board to ground, it requires a board pattern, which also makes difficult to achieve a low-profile connector.

In view of the problems described above, an object of the invention is to provide an electro-optical composite connector capable of solving the problems of the conventional electro-optical composite connector.

Further objects of the invention will be apparent from the following description of the invention.

SUMMARY OF THE INVENTION

In order to attain the objects described above, according to the present invention, an electro-optical composite connector to be mounted on a board comprises a plug connector and a receptacle connector. The plug connector includes a plug housing for holding an optical fiber; a plug shell for covering an outside of the plug housing; and an optical module to be connected to the optical fiber. The receptacle connector includes a receptacle housing to be mounted on a first board; a receptacle shell for covering an outside of the receptacle housing; and a receptacle terminal arranged on the receptacle housing. The optical module comprises a second board; a light receiving/emitting element mounted on one surface of the second board; a plug terminal or land mounted on the one surface of the second board for transmitting a signal relative to the receptacle terminal; and a grounding surface formed on the other surface of the second board opposite to the one surface of the second board. The grounding surface is electrically connected to an inner wall of the plug shell.

According to the present invention, in the electro-optical composite connector, the receptacle terminal and the plug terminal may connect to each other through compression.

According to the present invention, an electro-optical composite connector to be mounted on a board comprises a plug connector and a receptacle connector that can fit to each other. The plug connector includes a plug housing for holding an optical fiber; a plug shell for covering an outside of the plug housing; and an optical module to be connected to the optical fiber. The receptacle connector to be mounted on a motherboard at one surface thereof comprises a receptacle housing; a receptacle shell for covering an outside of the receptacle housing; and a receptacle terminal arranged on the receptacle housing. The optical module comprises a module board and a component mounted on one surface of the module board. The component includes a light receiving/emitting element for receiving an optical signal from the optical fiber and converting the optical signal to an electrical signal, or for receiving an electrical signal and converting the electrical signal to an optical signal. The component further includes a wiring disposed on the module board for transmitting the electric signal converted by the light receiving/emitting element to the receptacle terminal or transmitting the electric signal from the receptacle terminal to the light receiving/emitting element when the plug connector fits to the receptacle connector. The module board has a grounding surface on the other surface opposite to the one surface thereof for electrically connecting to an inner wall of an upper board of the plug shell.

According to the present invention, in the electro-optical composite connector, the plug shell may have a fitting recess portion for covering the receptacle connector mounted on the motherboard except the one surface thereof, when the plug connector fits to the receptacle connector. The wiring may be disposed in the fitting recess portion in an exposed state, so that the wiring contacts with the receptacle terminal through compression when the plug connector fits to the receptacle connector.

According to the present invention, in the electro-optical composite connector, the wiring of the component may be arranged on the one surface of the module board at a front-half part thereof, and the light receiving/emitting element may be arranged on the one surface of the module board at a rear-half part thereof.

According to the present invention, in the electro-optical composite connector, the plug shell may comprise a front section including the fitting recess portion and a rear section for protecting the light receiving/emitting element. The front section and the rear section may be partitioned with an inner bent section formed of an inward bent portion of a bottom board of the plug shell.

According to the present invention, in the electro-optical composite connector, the fitting recess portion may be formed of the one surface of the module board, a front inner surface of the plug shell, an outer surface of the inner bent section of the plug shell, and left and right inner surfaces of the plug shell.

According to the present invention, in the electro-optical composite connector, the receptacle shell may have a rear-face contact section forming an outermost wall of the receptacle connector and arranged to contact with a front inner wall of the plug shell when the plug connector fits to the receptacle connector. Further, the receptacle shell may have a contact arm forming an outermost wall of the receptacle connector and arranged to contact with an outer wall of the inner bent section of the plug connector when the plug connector fits to the receptacle connector.

According to the present invention, the electro-optical composite connector may have two contact arms having facing areas bent outward.

According to the present invention, the electro-optical composite connector may have cut-out tongues in a left and right side surfaces of the plug shell for positioning the module board in a vertical direction. The cut-out tongues are bent inward at a same height level and away from an inner wall of an upper board of the plug shell by a specified distance.

According to the present invention, in the electro-optical composite connector, the cut-out tongues are arranged to form a space with upper edges thereof and the inner wall of the upper board of the plug shell, so that the module board is inserted into the space with the grounding surface thereof facing upward in a state that the grounding surface is situated close to or contacts electrically with the inner wall of the upper board of the plug shell.

According to the present invention, in the electro-optical composite connector, the plug shell may have a spring contact leg in the upper board thereof. The spring contact leg is bent downward to contact with the grounding surface.

According to the present invention, in the electro-optical composite connector, the plug shell may have a front cut-out tongue in the upper board thereof. The front cut-out tongue is bent downward, so that a rear edge thereof hits a front edge of the module board to restrict the module board from moving frontward. Further, the plug shell may have a rear cut-out tongue in the upper board thereof. The rear cut-out tongue is bent downward, so that a front edge thereof hits a rear edge of the module board to restrict the module board from moving backward.

According to the present invention, in the electro-optical composite connector, the receptacle shell may have an elastic arm having a locking mechanism at a distal end thereof. The locking mechanism may be arranged to catch a locking mechanism disposed in the plug shell of the plug connector when the plug connector fits to the receptacle connector.

According to the present invention, in the electro-optical composite connector, the terminal of the receptacle connector may include a compression terminal.

According to the invention, for example, a low-profile electro-optical composite connector mounted on a board can be provided.

DESCRIPTION OF THE PREFERRED EMBODIMENTS

Hereunder, embodiments of the present invention will be explained with reference to the accompanying drawings.

Figure 1:
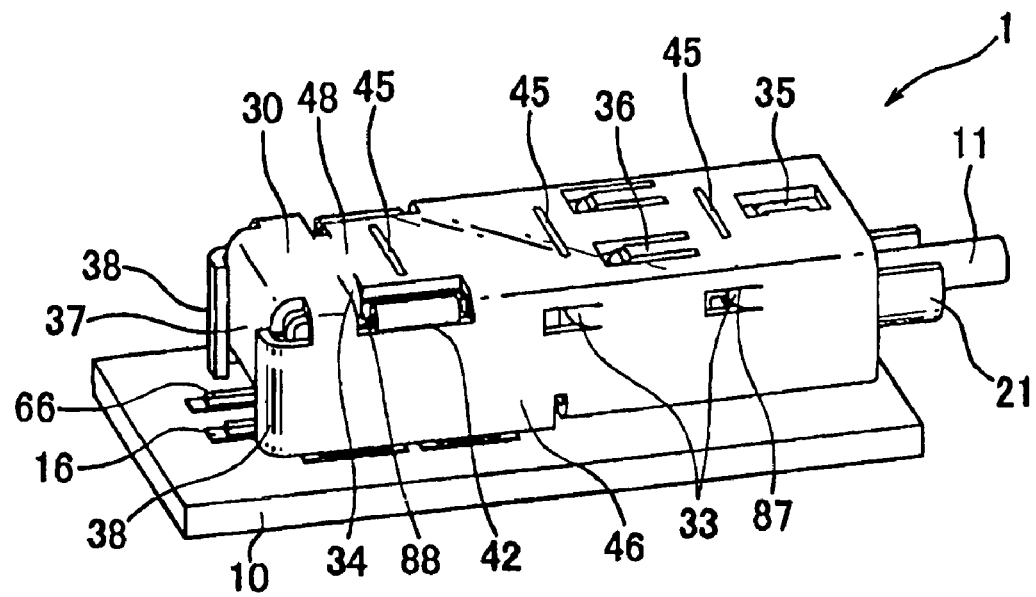
FIG. 1 is a perspective view showing an electro-optical composite connector according to a first embodiment of the present invention.
Figure 2:
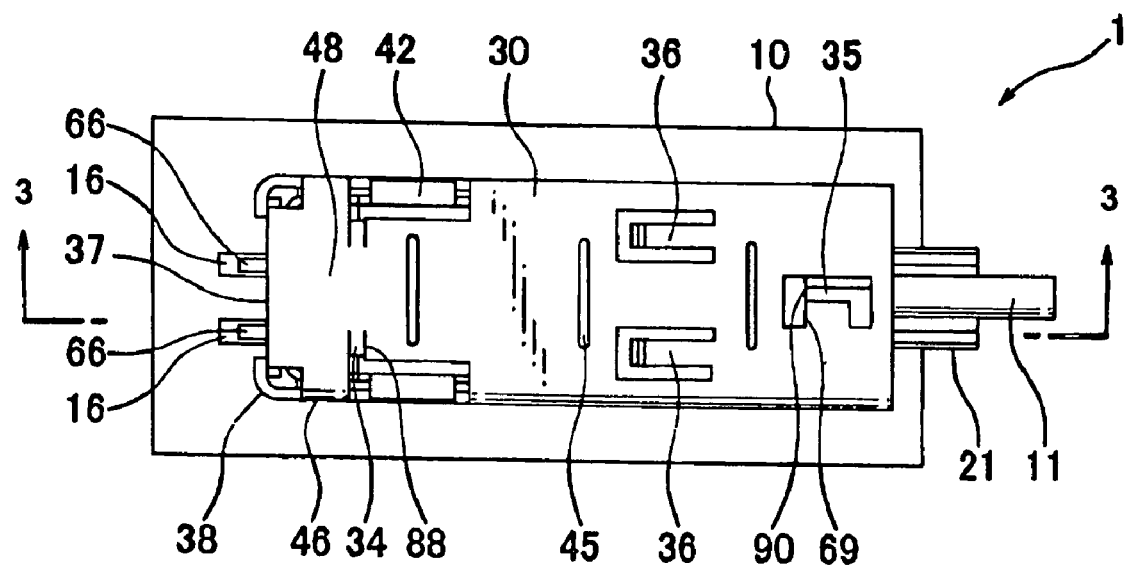
FIG. 2 is a plan view of the electro-optical composite connector according to the first embodiment of the present invention.
Figure 3:
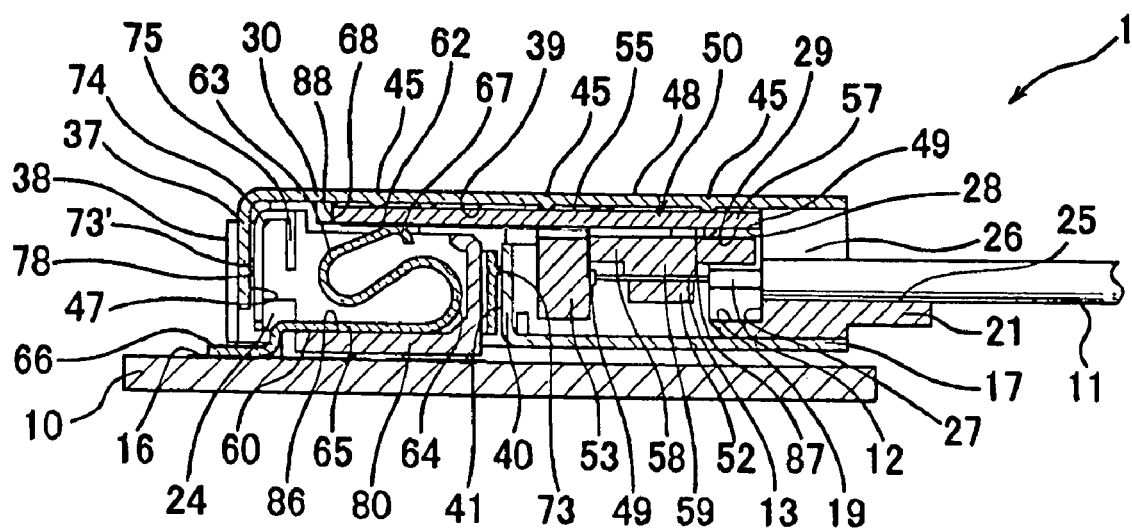
FIG. 3 is a sectional view of the electro-optical composite connector taken along a line 3-3 in FIG. 2.

FIGS. 1-3 show an electro-optical composite connector 1 according to a first embodiment of the present invention. The electro-optical composite connector 1 comprises a pair of a plug connector (a connector having an optical module) 2 and a receptacle connector 6, which can fit to each other in a height direction thereof. In use, the receptacle connector 6 is mounted on a motherboard 10, and the plug connector 2 is fitted onto the receptacle connector 6 mounted on the motherboard 10.

FIG. 1 is a perspective view of the plug connector 2 and the receptacle connector 6 in use. FIG. 2 is a plan view of the plug connector 2 and the receptacle connector 6. FIG. 3 is a cross-sectional view of the plug connector 2 and the receptacle connector 6 taken along a line 3-3 in FIG. 2. Note that a size of the electro-optical composite connector (not including the motherboard 1) illustrated in the figures is very small, for example, 5-7 mm long, 2 mm wide, and 1.5 mm high.

Figure 11:
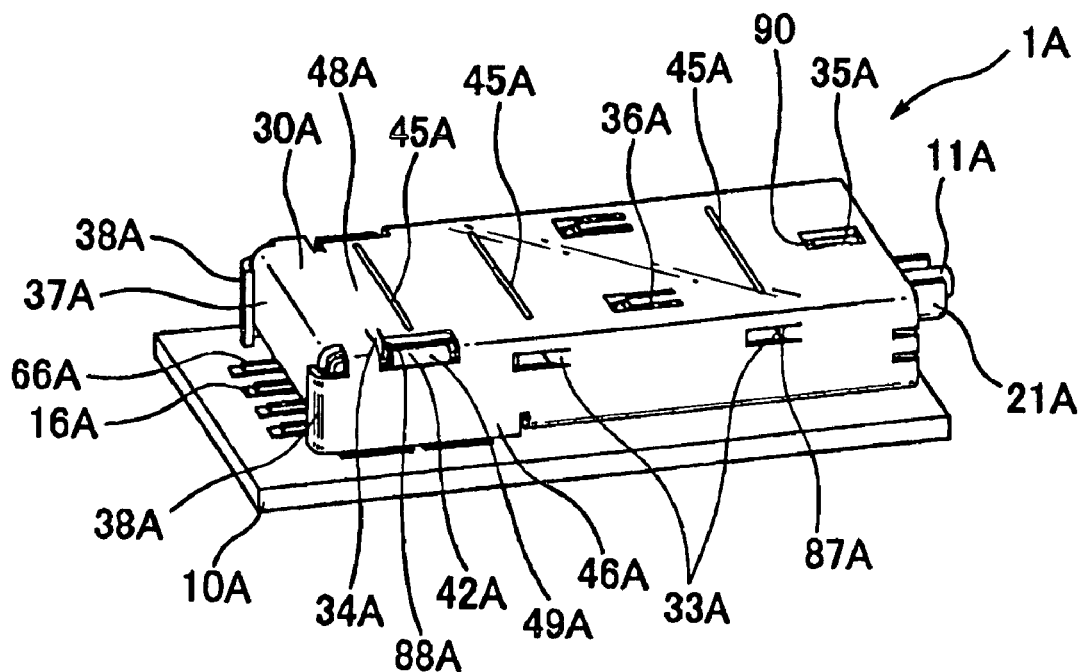
FIG. 11 is a perspective view showing an electro-optical composite connector according to a second embodiment of the present invention.
Figure 12:
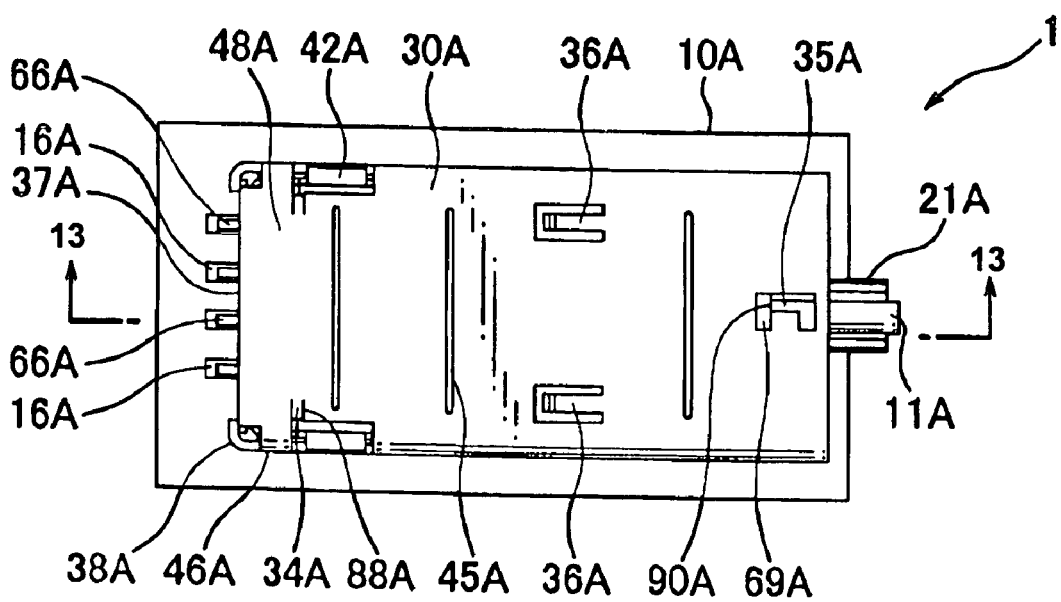
FIG. 12 is a plan view of the electro-optical composite connector according to the second embodiment of the present invention.

For communication, the electro-optical composite connector 1 is arranged on each of a transmitting end and a receiving end. For explanation, in the specification, a first connector 1 illustrated in FIGS. 1 to 3 is used at the transmitting end, and a second connector 1A illustrated in FIGS. 11 to 13 (described later) is used at the receiving end. A configuration of the first connector 1 is basically the same as that of the second connector 1A.

In the embodiment, the first connector 1 is disposed in, for example, a main body of a mobile phone having operation keys, and the second connector 1A is disposed in a display of the mobile phone having a display screen, so that a signal can be transmitted through optical transmission between the main body and the display of the mobile phone. In this case, an electrical signal is transmitted between the main body of the mobile phone and the first connector 1, and between the display of the mobile phone and the second connector 1A. An optical signal is transmitted between the first connector 1 and the second connector 1A.

Figure 4:
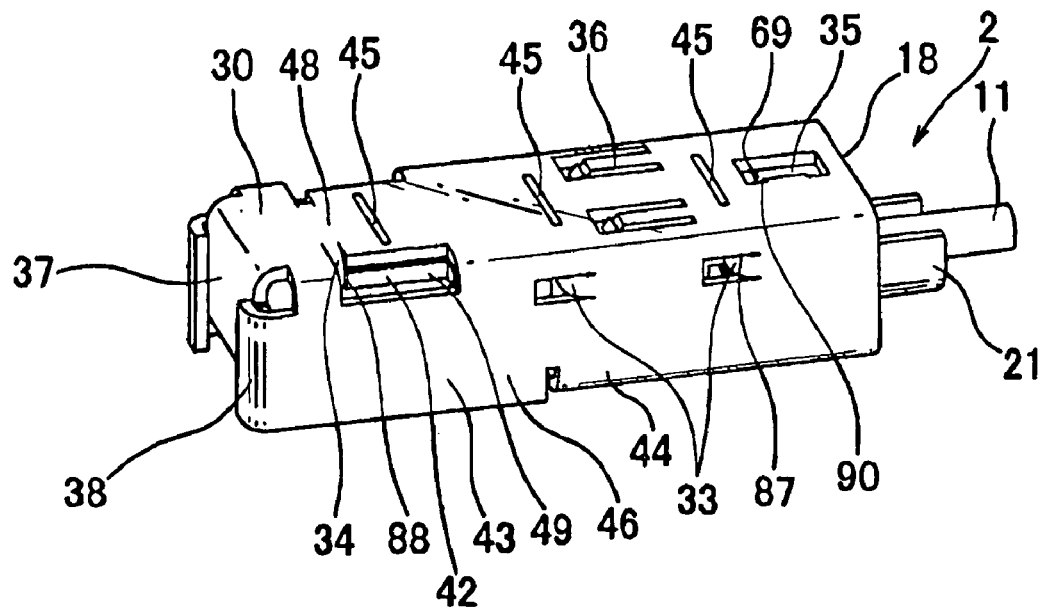
FIG. 4 is an upper perspective view showing a plug connector of the electro-optical composite connector according to the first embodiment of the present invention.
Figure 5:
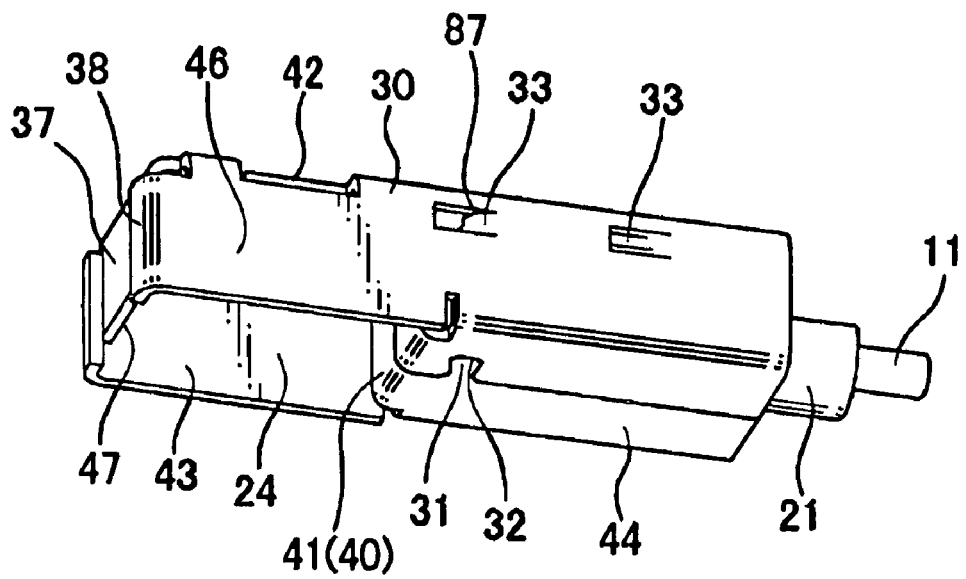
FIG. 5 is a lower perspective view of the plug connector of the electro-optical composite connector according to the first embodiment of the present invention.
Figure 6:
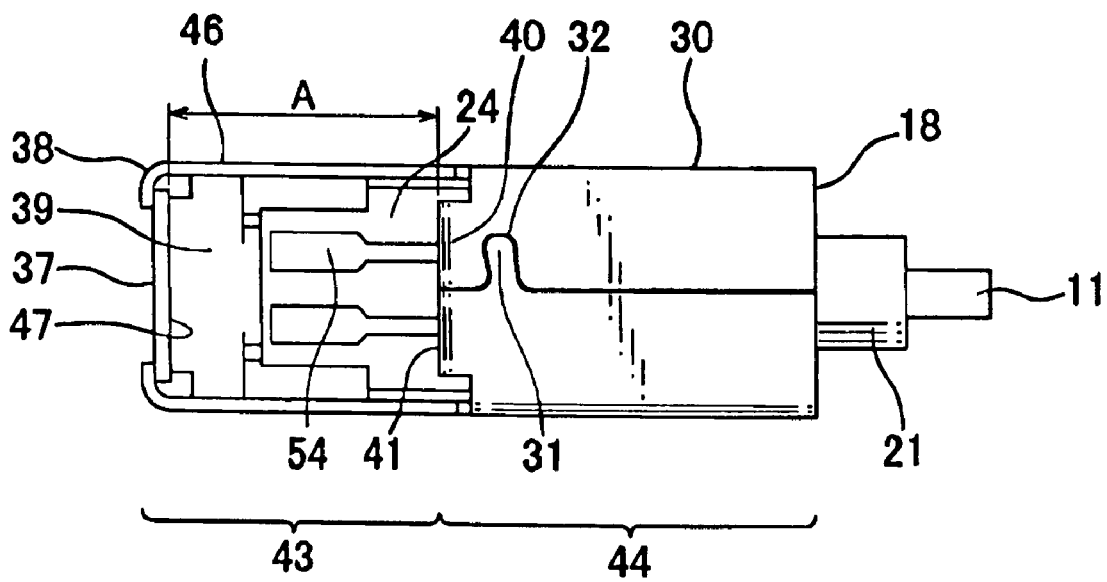
FIG. 6 is a bottom view of the plug connector of the electro-optical composite connector according to the first embodiment of the present invention.
Figure 7:
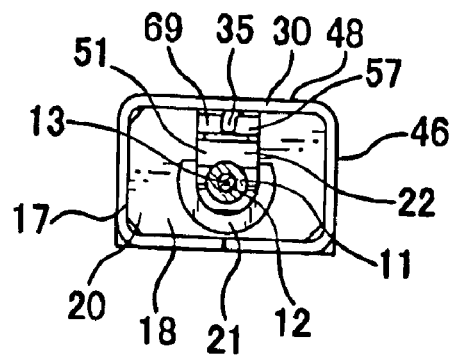
FIG. 7 is a backside view of the plug connector of the electro-optical composite connector according to the first embodiment of the present invention.
Figure 8:
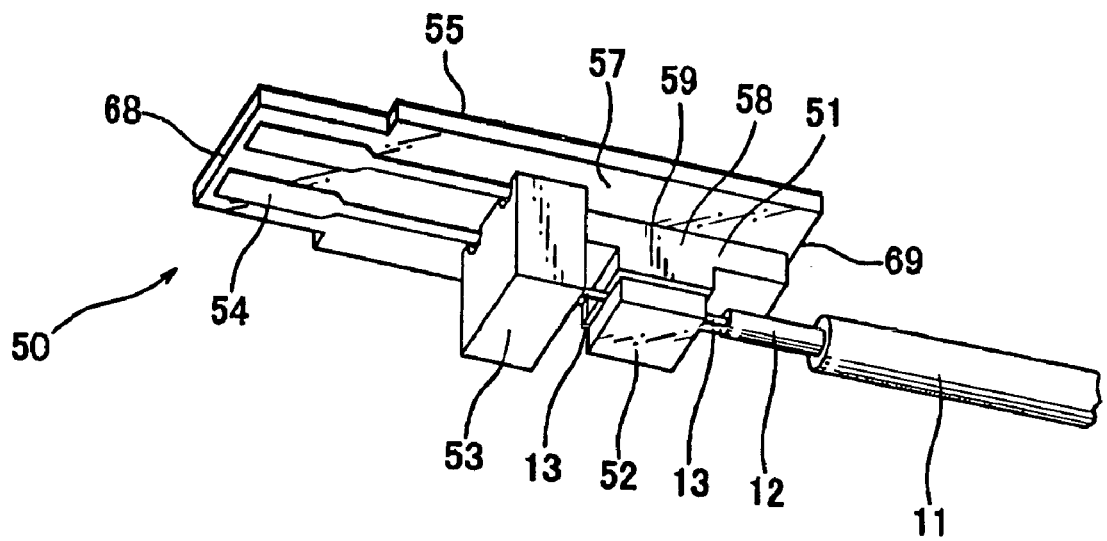
FIG. 8 is a perspective view showing an optical module arranged inside the plug connector of the electro-optical composite connector according to the first embodiment of the present invention.

Referring to FIGS. 1-8, a configuration of the first connector 1, especially the plug connector 2, will be described next. FIG. 4 is an upper perspective view of the plug connector 2. FIG. 5 is a lower perspective view thereof. FIG. 6 is a bottom view thereof. FIG. 7 is a backside view thereof. FIG. 8 is a perspective view of an optical module arranged inside the plug connector 2.

The plug connector 2 mainly comprises a plug housing 20; a plug shell 20 to cover the plug housing 20; and an optical module 50 arranged inside the plug shell 30. As shown in FIGS. 3 and 8, the optical module 50 comprises a module board 57 and various components mounted on a front surface (one surface) of the module board 57.

On a backside surface (other surface) of the module board 57, a grounding surface 55 is formed all over the surface. On the front surface of the module board 57, a base 51; a securing board 52; a block 53; and signal lands (plug terminals) 54 or wiring patterns on the module board 57 are mounted. Components other than the signal lands 54 are arranged on a rear-half part of the front surface, and the signal lands 54 are arranged on a front-half part of the front surface (one surface).

The signal lands 54 contact with corresponding terminals 60 (receptacle terminals) of the receptacle connector 6 when the plug connector 2 fits to the receptacle connector 6. The signal lands 54 are formed of a metal attached with a conductive adhesive or through printing. The base 51 is formed of a relatively large lower base 58 and a relatively small upper base 59 placed on the lower base 58, and is used for mounting and positioning an optical fiber 11. The upper base 59 has an upper groove (not illustrated) to arrange fiber wires 13 of a fiber core wire 12 of the optical fiber 11. The securing board 52 is arranged on the upper base 59 for covering and holding a part of the fiber wires 13 on the upper base 59.

In the embodiment, a light receiving/emitting element (EO/OE converting module) 49 is attached to a wiring on a vertical surface of the block 53 for converting between an optical signal and an electrical signals. Therefore, signals transmitted from the corresponding terminals (60) of the receptacle connector 6 to the signal lands 54 contact with the patterns on the vertical surfaces of the block 53 via the wiring 54 on the module board 57. The light receiving/emitting element 49 (specifically used as a light emitting element) receives the electrical signals and converts the electrical signals to optical signals, thereby transmitting the optical signals to the fiber wires. The light receiving/emitting element 49 may include, for example, VCSEL, flip-chip, receiver optical sub-assembly (ROSA), transmitter optical sub-assembly (TOSA), laser diode (LD), and photodiode (PD).

As shown in FIG. 7, the plug housing 20 is substantially rectangular as a whole. The side faces 17 of the plug housing 20 are cylindrically and very tightly covered by the plug shell 30, and the front part is loosely covered by the plug shell 30. The rear face 18 of the plug housing 20 is exposed. The rear face 18 of the plug housing 20 has an opening 22 to put the optical fiber 11 into the plug housing 20, and a half-cylindrical cable supporting section 21 is provided to support the optical fiber 11 extending through the opening 22.

The front part of the plug housing 20 has a bottom board 25 and side boards 26, and other parts thereof are opened. The opening is used as a space to arrange components to mount on the rear-half surface (rear-half part of one surface) of the module board 57. On the front part of the sidewall 26, a step portion 29 lower than a top portion by a height difference 28 is formed in a manner similar to the lower tier 19 formed by reducing one step for the height 28 at the front part of the bottom board 25. Once the module board 57 is mounted in the plug housing 20, the both left and right rear edges of the module board 57 are supported with the step portion 29 of the left and right sidewalls 26.

The plug shell 30 is formed of a flat metal sheet through punching out and bending. The plug shell 30 protects inner components in the shell from outer impact, and functions as an electrical shielding. In order to use the plug shell 30 for electrically shielding, a part of the plug shell 30 is connected to ground. For example, the plug shell 30 can be connected to ground via the motherboard on which the receptacle connector 6 is secured.

The plug shell 30 generally comprises two sections, i.e. a front section 43 and a rear section 44, respectively formed at substantially front and rear portions. The front section 43 has a fitting recess portion 24 to fit the receptacle connector 6 therein. At the fitting recess portion 24, when the module board 57 is positioned inside the plug shell 30, the signal lands 54 provided on the front-half part of the surface of the module board 57 are exposed.

The rear section 44 is a cylindrical section to protect components mounted on the rear-half part of the surface of the module board 57. As shown in FIG. 5, to maintain the cylindrical shape of the cylindrical section, one edge of the plug shell 30 has a protrusion 31, and the other edge has a dent 32. When the plug shell 30 is assembled, the protrusion and the dent fit to each other. The front section 43 and the rear section 44 connect to each other via the upper board 48 and the left and right side bent sections 46, and are completely separated near the center part of the bottom of the plug shell 30 by inner bent sections 40. The inner bent sections 40 are a part of the backboard extending from the rear side to the front side and bent inward.

The fitting recess portion 24 is formed of the front-half part of the surface of the module board 57; an inner wall 47 of the front bent section (front wall) 37; an exterior walls 41 of the inner bent sections 40; and an inner wall of the side bent sections 46 (left and right sidewalls). In order to fill a gap between the front bent section 37 and the side bent sections 46, the front extended sections 38 of the side bent sections 46 are bent inward so as to cover the both sides of the front bent section 37 from the outside.

The fitting recess portion 24 covers the receptacle connector 6 from the upper side except the bottom surface of the receptacle connector 6 secured on the motherboard 10 when the plug connector 2 fits to the receptacle connector 6. At this time, the signal lands 54 arranged in the fitting recess portion 24 in an exposed state contact with the upper portion of the compression terminals 60, which are the corresponding terminals in the receptacle connector 6, while being compressed.

Accordingly, the signal lands 54 and the compression terminals 60 are securely connected to each other by specific force applied thereto, and electrical communication can be securely made between the plug connector 2 and the receptacle connector 6 via the contact between the signal lands 54 and the compression terminals 60. At the same time, the rear contact section 78 of the receptacle shell 70, which is the outermost wall of one side of the receptacle connector 6, contacts with the inner wall 47 of the front bent section 37 of the plug connector 2. Furthermore, the contact arms 72 that form the outermost wall opposite the rear contact section 78 of the receptacle shell 70 contact with the outer wall 41 of the inner bent section 40 of the plug connector 2.

Through the contact between the rear contact section 78 of the receptacle connector 2 and the inner wall 47 of the front bent section 37 of the plug connector 2, and the contact between the contact arms 72 of the receptacle connector 6 and the outer wall 41 of the inner bent section 40 of the plug connector 2, the receptacle connector 6 is securely connected to ground via the plug connector 2.

Optionally, by providing a circular protrusion 73 on the outer surface of the contact arms 73 and similarly providing another circular protrusion 73' on the rear-surface contact section 78 of the receptacle shell 70, the above-described contact can be even more secured.

In order to position the module board 57 inside the plug shell 30, the plug shell 30 is machined to directly position the optical module 50. In order to enable the plug shell 30 to position the module board 57, four protruding cut-out tongues 33 are formed on the side surfaces of the plug shell 30. Two of the cut-out tongues 33 are provided on each of the side surfaces by cutting and bending each of the right and left side bent sections 46 at the same height level away from the inner wall 39 of the upper board 48 (backside of the ceiling section) by a certain distance (slightly longer than a thickness of the module board 57). By positioning the optical module 50 directly by the plug shell 30, the number of components and the size of the plug connector 2 can be reduced.

The module board 57 is inserted from the backside of the plug shell 30 into a space formed by the upper edges 87 of the cut-out tongues 33 on the side surfaces and the inner wall 39 of the upper board 48. The module board 57 is inserted in a state that the module board 57 is turned over. More specifically, the module board 57 is inserted while the module board 57 is turned over with the grounding surface 55 facing upward in a state that the grounding surface 55 of the module board 57 is situated closely or contacts to electrically connect to the inner wall 39 of the upper board 48 of the plug shell 30. Accordingly, the components do not have to protrude to the grounding surface 55, thereby reducing the height to the components, the size of the connector, and the number of the components.

In order to securely contact the plug shell 30 to the grounding surface 55, two protruding spring contact legs 36 may be formed by cutting and bending downward the left and right portions of the upper board 48 for contacting with the grounding surface 55 at least at ends thereof. In addition, in place of the spring contact legs 36, the plug shell 30 may have a hole or a notch (not illustrated) for contacting with and securing to the grounding surface 55 by solder or an electroconductive adhesive. More specifically, by pouring solder or an electroconductive adhesive through the hole or notch into a gap between the plug shell 30 and the grounding surface 55, the gap can be filled and the contact between the plug shell 30 and the grounding surface 55 can be secured.

In addition to the above-described hole or notch, the upper board 48 of the plug shell 30 may have a similar hole or notch (not illustrated) for various reasons. In this case, the plug shell 30 has the grounding surface 55, so that the hole or notch is covered by the grounding surface 55. Therefore, according to the above-configuration, it is easy to deal with EMI.

In order to restrict the frontward movement of the module board 57 in the plug shell 30, the plug shell 30 may have two protruding front bent sections 34 at the front part of the upper board 48 by cutting and bending downward the left and right parts of the upper board 48 at the front part.

Similarly, in order to restrict the backward movement of the module board 57, the plug shell 30 may have a protruding rear cut-out tongue 35 that can touch the rear edge 69 of the module board 57 at the front edge 90 by cutting and bending downward a part of the rear part of the upper board 48 near the center of the upper board 48 while having the front edge 68 of the module board 57 contact with the rear edge of the front bent sections 34.

Furthermore, in order to eliminate wobbling of the module board 57 in the height direction of the connector, the plug shell 30 may have linear protrusions 45 by punching a part of the upper board 48 downward, so as to push the grounding surface 55 of the module board 57 by the upper board 48. By designing this way, the forward and backward movements of the module board 57 can be restricted, and the plug shell 30 securely holds the module board 57.

Figure 9:
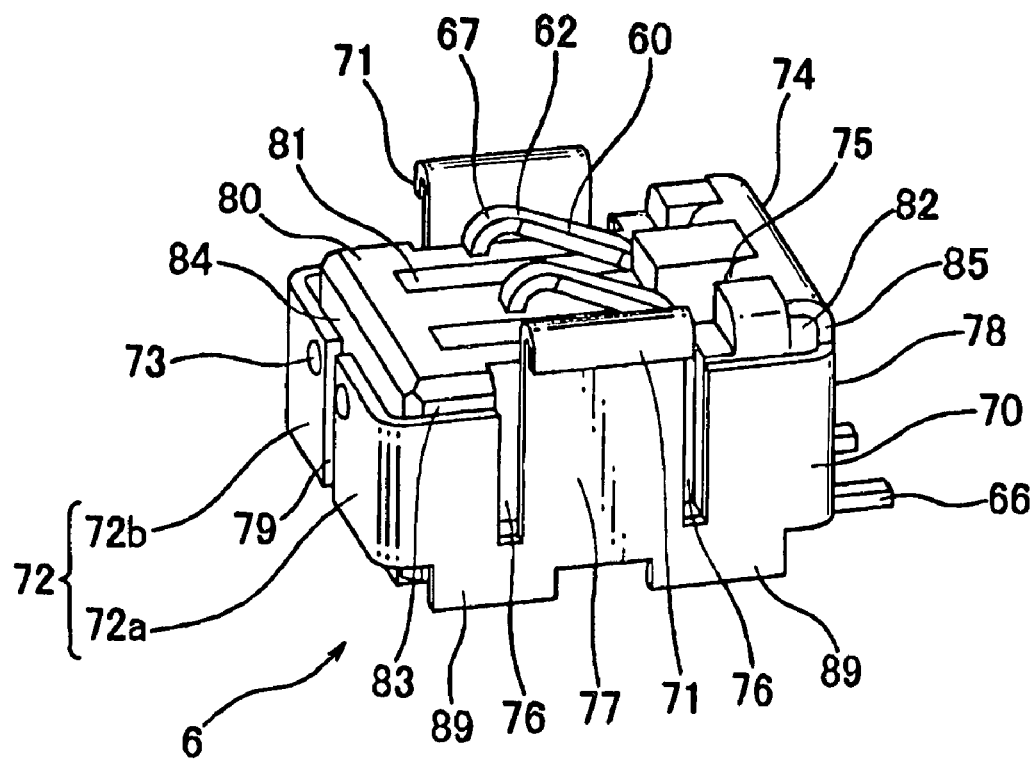
FIG. 9 is an upper perspective view showing a receptacle connector of the electro-optical composite connector according to the first embodiment of the present invention.
Figure 10:
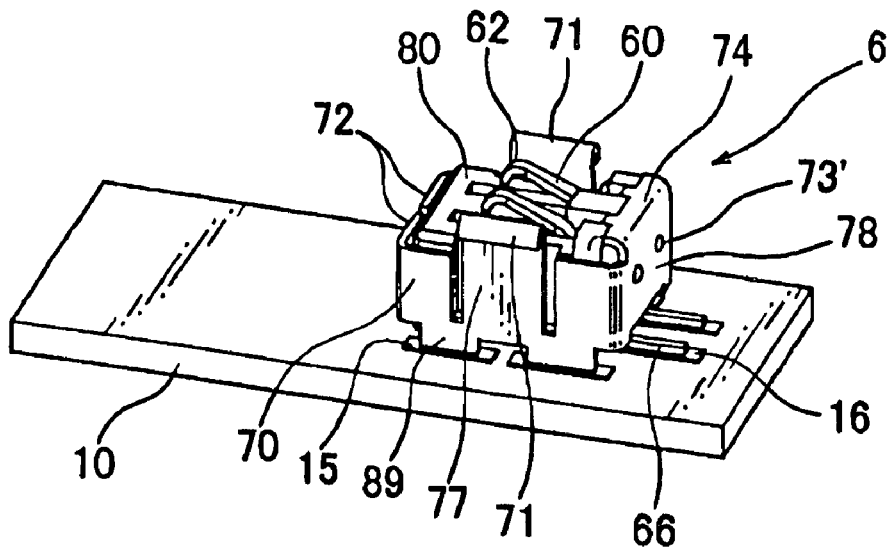
FIG. 10 is a perspective view of the receptacle connector secured on a motherboard according to the first embodiment of the present invention.

With reference to FIGS. 1 to 3, 9 and 10, the configuration of the first connecter 1, especially the receptacle connector 6, will be described next. FIG. 9 is an upper perspective view of the receptacle connector 6. FIG. 10 is a perspective view of the receptacle connector 6 secured on the motherboard 10.

The receptacle connector 6 mainly comprises a receptacle housing 80; a receptacle shell 70 that covers the receptacle housing 80; and compression terminals 60 that are arranged and secured in the receptacle housing 80 in a state that the front ends and the rear ends thereof are exposed.

The receptacle housing 80 has a box shape as a whole. The receptacle housing 80 has two terminal housing sections 81 to arrange the compression terminals 60 vertically from the upper face to the bottom face of the receptacle housing 80. The compression terminals 60 are inserted to the terminal housing sections 81 from above, and secured therein while the front-end contact sections 62 and the rear-end sections 66 are exposed. In order to protect near the front-end contact sections 62, a part of the rear upper surface of the plug housing 80 slightly protrudes upward so as to form a protrusion 82.

The receptacle shell 70 is formed of a flat sheet metal by punching out and bending. The receptacle shell 70 substantially covers the left and right side faces 83, the front face 84, and the rear face 85 of the receptacle housing 80.

The contact arms 72a and 72b of the receptacle shell 70, which cover the front face 84 of the receptacle housing 80, form the outermost wall of the receptacle connector 6 at one side, and can contact with the outer wall 41 of the inner bent section 40 of the plug connector 2 when the plug connector 2 fits to the receptacle connector 6. In order to securely contact the contact arms 72a and 72b with the outer wall 41 of the inner bent section 40, the contact arms 72a and 72b are bent slightly outward at the facing section 79 where the contact arm 72a faces the contact arm 72b.

As a result, a dimension between the rear-face contact section 78 and the contact arms 72 is slightly larger than a longitudinal dimension of the fitting recess portion 24 (represented by "A" in FIG. 6), i.e., a dimension between the inner wall 47 of the front bent section 37 and the outer wall 41 of the inner bent section 40. Further, the contact arms 72 elastically contact with the inner bent section 40, thereby securing the contact. In addition, as described above, by providing the circular protrusions 73 on the outer surface of the contact arms 72, the contact between the contact arms 72 and the outer wall 41 of the inner bent section 40 can be secured.

The rear-face contact section 78 of the receptacle shell 70, which covers the rear face of the receptacle housing 80, forms the outermost wall of the receptacle connector 6 at the side opposite to the contact arms 72 of the receptacle connector 6. The rear-face contact section 78 can contact with the inner wall 47 of the front bent section 37 of the plug connector 2 when the plug connector 2 fits to the receptacle connector 6.

The rear contact section 78 has a covering section 74 that extends upward and continuously covers from the rear face of the receptacle housing 80 to the protrusion 82 on the rear upper face. The end portions 75 of the covering section 74 are bent to a U-shape, and inserted to the receptacle housing 80 so as to hold the protruding section 82 of the receptacle housing 80. With this configuration, the receptacle shell 70 is completely secured to the receptacle housing 80.

Two slits 76 are provided near the center of each side face of the receptacle shell 70, which covers the left and right side faces 83 of the receptacle housing 80, in the height direction of the receptacle connector 6 from the bottom side to the upper edge of the receptacle shell 70. With the slits 76, elastic sections 77 are formed. Furthermore, by extending the end of each elastic section 77 slightly upward and then bending outward so to form an "r" character shape, each elastic section 77 has a locking mechanism 71. The locking mechanism 71 are caught and locked from inside into the locking holes 42 provided in the plug shell 30 of the plug connector 2 when the plug connector 2 fits to the receptacle connector 6, thereby restricting the upward movement of the plug shell 30 and locking the plug connector 2 to the receptacle connector 6.

By slightly extending downward a part of the receptacle shell 70, which covers the left and right side faces of the receptacle housing 80, motherboard securing sections 89 are formed. By fitting and soldering the motherboard securing sections 89 into the corresponding holes 15 (see FIG. 10) provided on the motherboard 89, and then by soldering the board mounting section 66 of the compression terminals 60, which are secured on the receptacle housing 80, on solder-securing sections 16 on the motherboard 10, the receptacle housing 80 and the receptacle shell 70 are completely secured on the motherboard 10.

Figure 13:
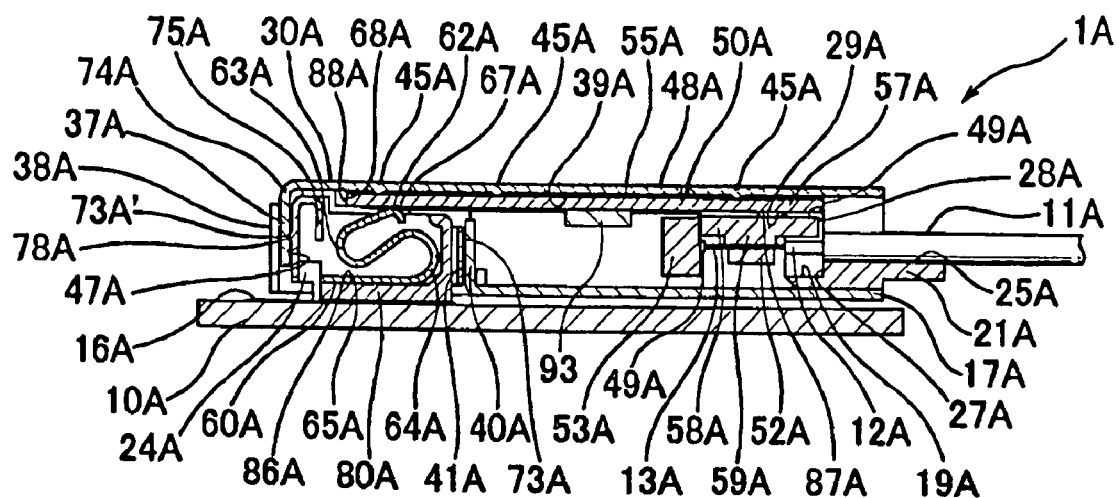
FIG. 13 is a sectional view of the electro-optical composite connector taken along line 13-13 in FIG. 12.
Figure 14:
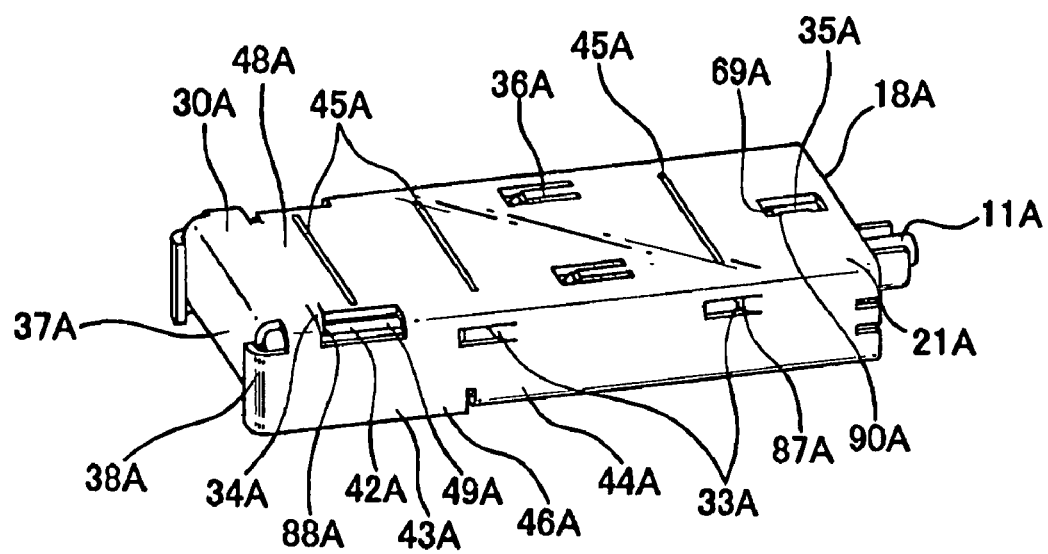
FIG. 14 is an upper perspective view showing a plug connector of the electro-optical composite connector according to the second embodiment of the present invention.
Figure 15:
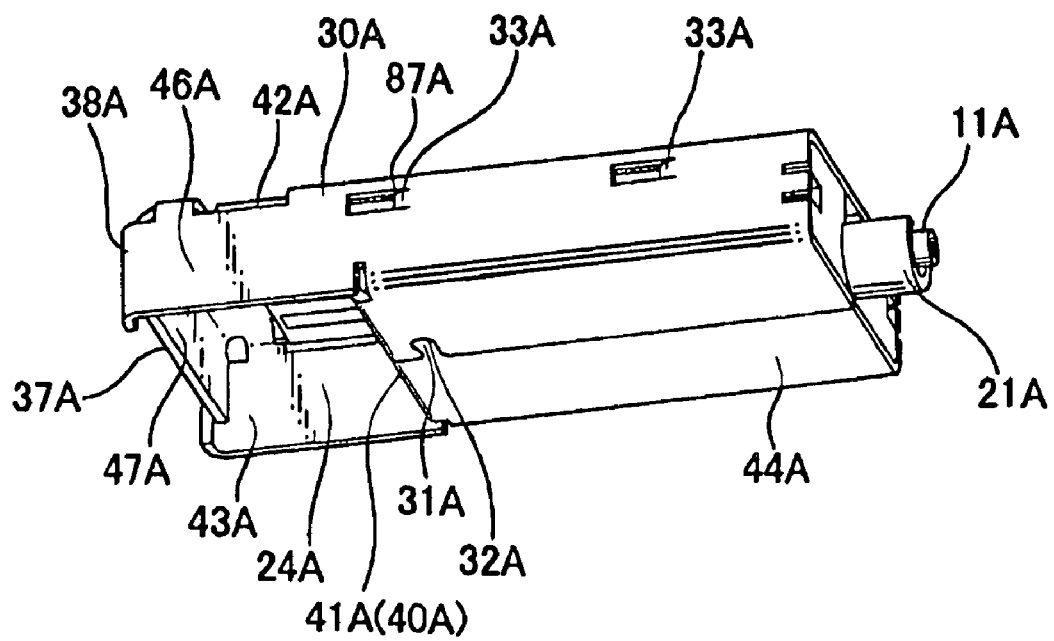
FIG. 15 is a lower perspective view of the plug connector of FIG. 14 according to the second embodiment of the present invention.
Figure 16:
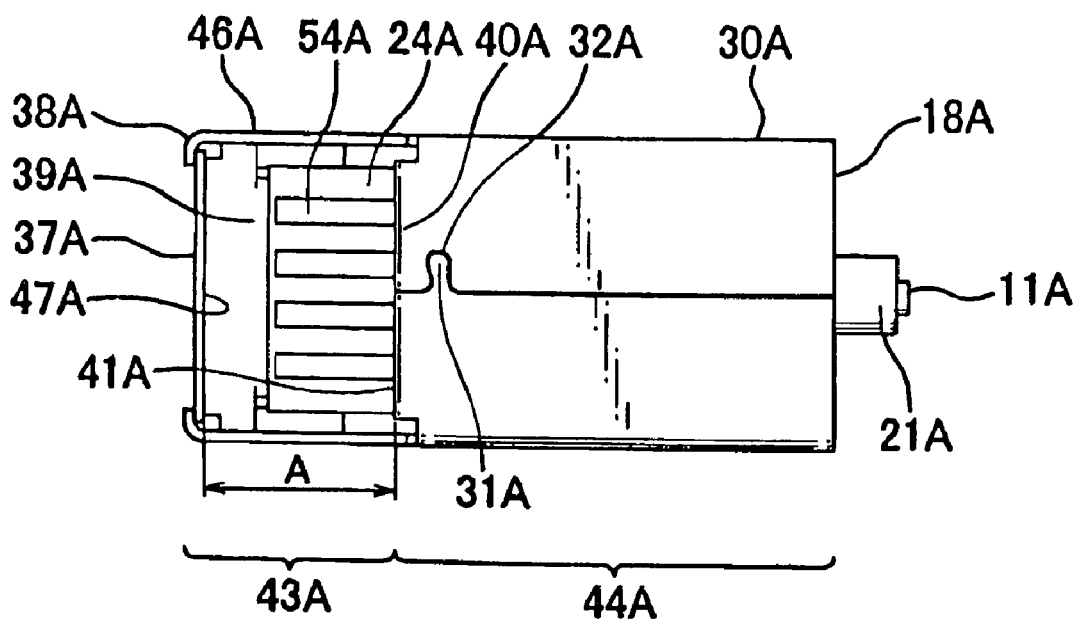
FIG. 16 is a bottom view of the plug connector of the electro-optical composite connector according to the second embodiment of the present invention.
Figure 17:
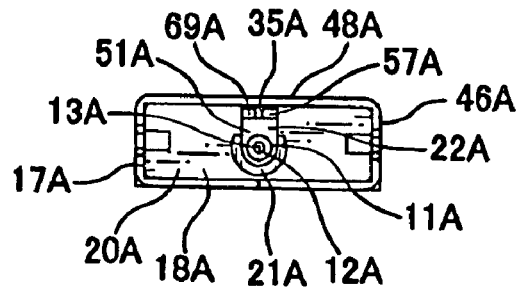
FIG. 17 is a backside view of the plug connector of the electro-optical composite connector according to the second embodiment of the present invention.

As shown in FIG. 13, the compression terminals 60 arranged in the receptacle housing 80 have a substantially an S character shape as a whole. Each compression terminal 60 comprises a contact section 62; a first bent section 63; a second bent section 64 that is bent in a direction opposite to the first bent section 63; a housing securing section 65; and a board mounting section 66; which are continuously provided in this order. Among the elements, the contact sections 62 and the board mounting sections 66 are provided in a state exposed to the outside of the receptacle connector 6. The other elements are inserted and disposed inside the receptacle housing 80 so as to enable displacement.

The contact sections 62 contact with the signal lands 54 on the module board 57 of the plug connector 2 when the plug connector 2 fits to the receptacle connector 6, and have lightly bent ends 67 so as to secure the contact. Since the signal lands 54 are designed to directly contact with the compression terminals 60, the number of components can be reduced.

The housing securing sections 65 are tightly secured on the bottom 86 of the receptacle housing 80. The compression terminals 60 are formed of small and thin pieces, and need to have enough elasticity when the contact sections 62 contact with the signal lands 54 of the plug connector 2. In the embodiment, the compression terminals 60 have the two bent sections, i.e., the first bent section 63 and the second bent section 64, between the contact section 62 and the housing securing section 65 so as to generate an elastic force.

FIGS. 11 to 20 show a configuration of the second connector 1A. The second connector 1A is paired with the first connector 1 described above, and is used as an element for receiving the signals from the first connector 1. FIGS. 11 to 20 correspond to FIGS. 1 to 10, respectively. In FIGS. 11 to 20, components similar to those shown in FIGS. 1 to 10 are denoted the same reference numerals with "A".

Figure 18:
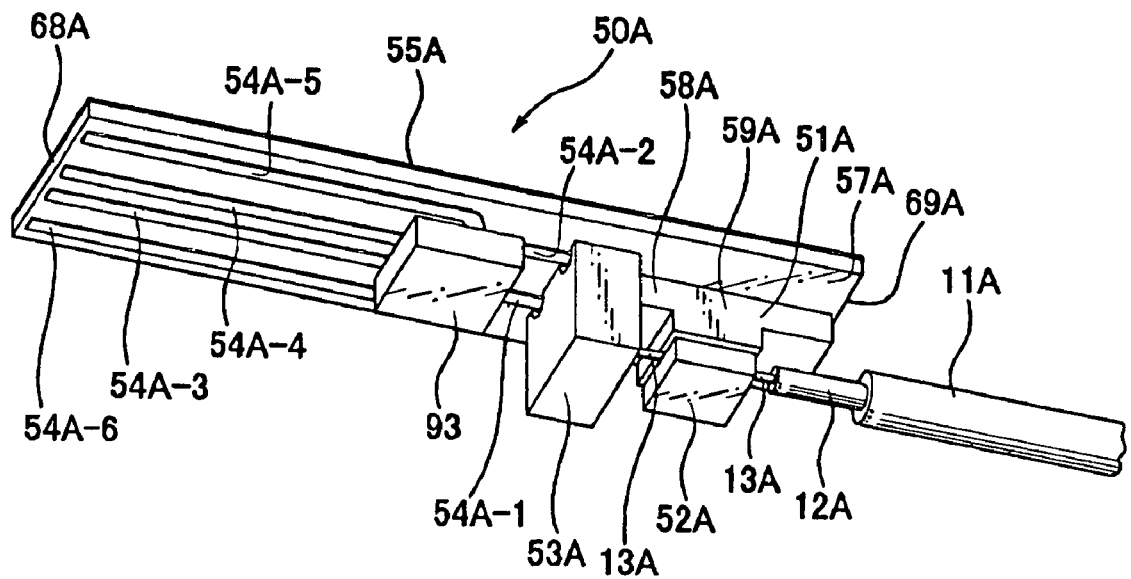
FIG. 18 is a perspective view showing an optical module arranged inside the plug connector of the electro-optical composite connector according to the second embodiment of the present invention.
Figure 19:
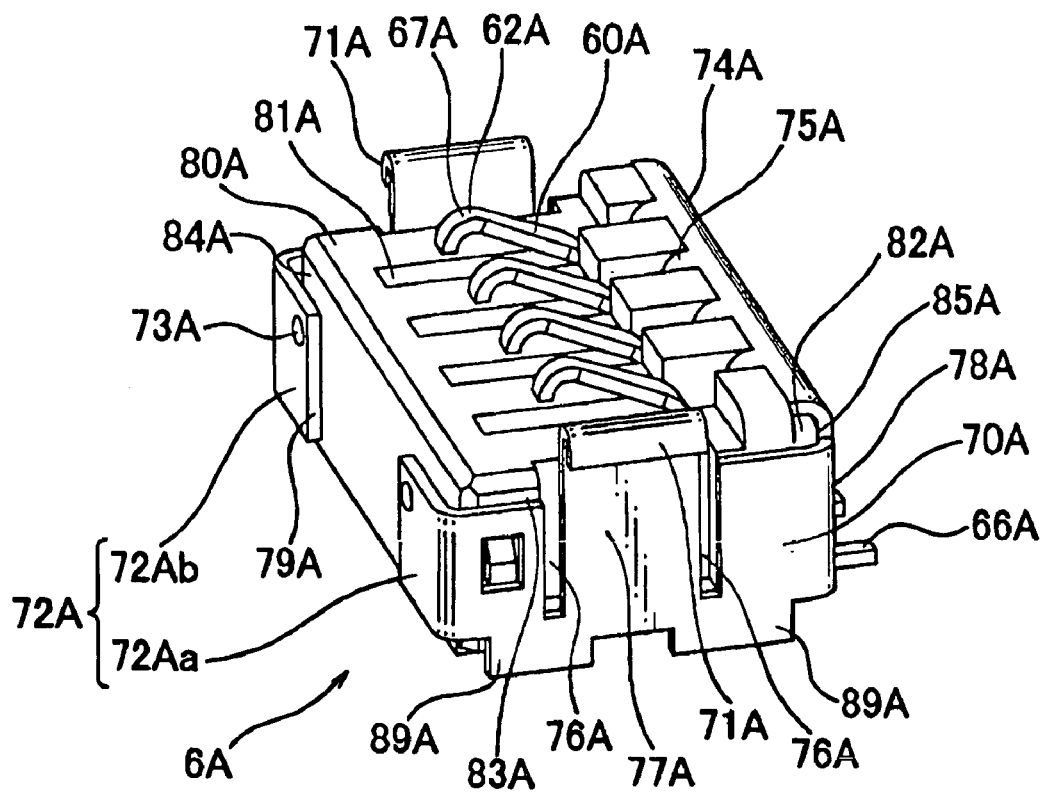
FIG. 19 is an upper perspective view showing a receptacle connector of the electro-optical composite connector according to the second embodiment of the present invention.
Figure 20:
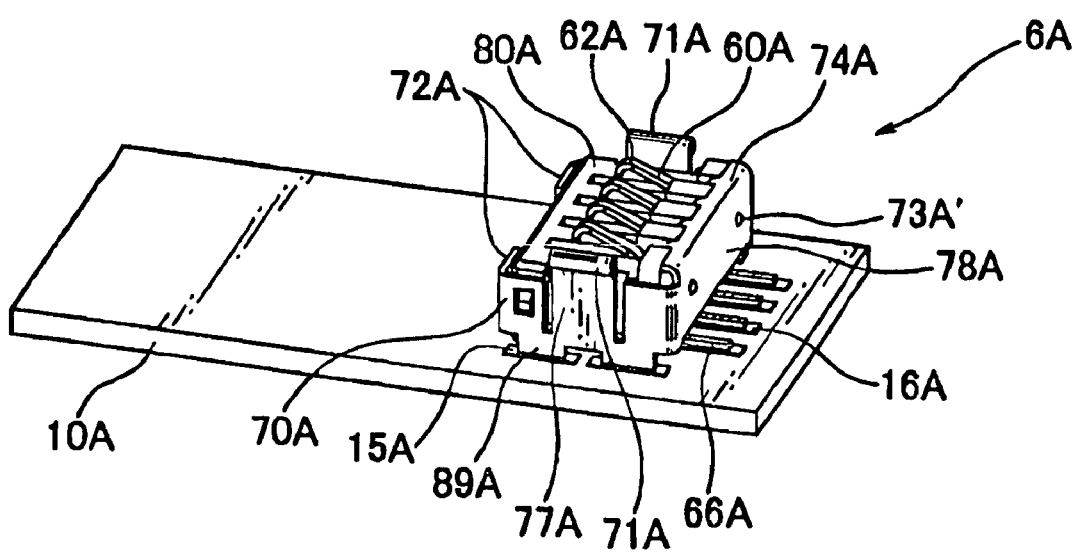
FIG. 20 is a perspective view of the receptacle connector secured on a motherboard according to the second embodiment of the present invention.

A difference between the second connector 1A and the first connector 1 is as follows. As shown in FIG. 18, the second connector 1A has an amplifier 93 to amplify the signals on the module board 57A, so that the second connector 1A is used at the receiving end for receiving the signals. Further, two signal lands 54A-1 and 54A-2 are provided on one side to input or output the signals relative to the amplifier 93, and four signal lands 54A-3, 54A-4, 54A-5, and 54A-6 are provided on the other side to output or input the signals relative to the amplifier 93. Furthermore, as shown in FIGS. 19 and 20, corresponding to the signal lands (54A-3, 54A-4, 54A-5, and 54A-6), four compression terminals 60A are provided.

An electric current from the light receiving/emitting element 49A (used as a light receiving element in the embodiment) is transmitted to the amplifier 93 via the signal lands 54A-1 and 54A-2, and then amplified. In this case, the signal land 54A-1 functions as, for example, a plus wire, and the signal land 54A-2 functions as a minus wire.

The electric current amplified at the amplifier 93 is then transmitted to the corresponding compression terminals 60 through the signal land 54A-3 functioning as a plus wire and the signal land 54A-4 functioning as a minus wire. The signal lands 54A-5 and 54A-6 function as a ground wire (GND wire), an amplifier driving wire, or other types of wires. The signal lands 54A-5 and 54A-6 are connected to the corresponding compression terminals 60A.

As shown in FIG. 18 that corresponds to FIG. 8 showing the first connector 1, the components mounted on the module board 57A are simply illustrated as a box 56A. As described above, the configuration of the second connector 1A is substantially the same as that of the first connector 1, and a further explanation thereof is omitted.

In the above-described embodiments, the receptacle connector 6 has the compression terminals 60, so that the receptacle connector 6 has a compression function, and the plug connector 2 may have the compression function. More specifically, the receptacle connector 6 does not necessarily have to have the compression terminals 60. For example, the plug connector 2 may have compression terminals similar to the compression terminals 60 in place of the signal lands 54 on the module board 57, and the receptacle connector 6 may have a flat surface similar to the signal lands 54. With this configuration, the receptacle connector 6 can connect to the plug connector 2 through compression.

Figure 21:
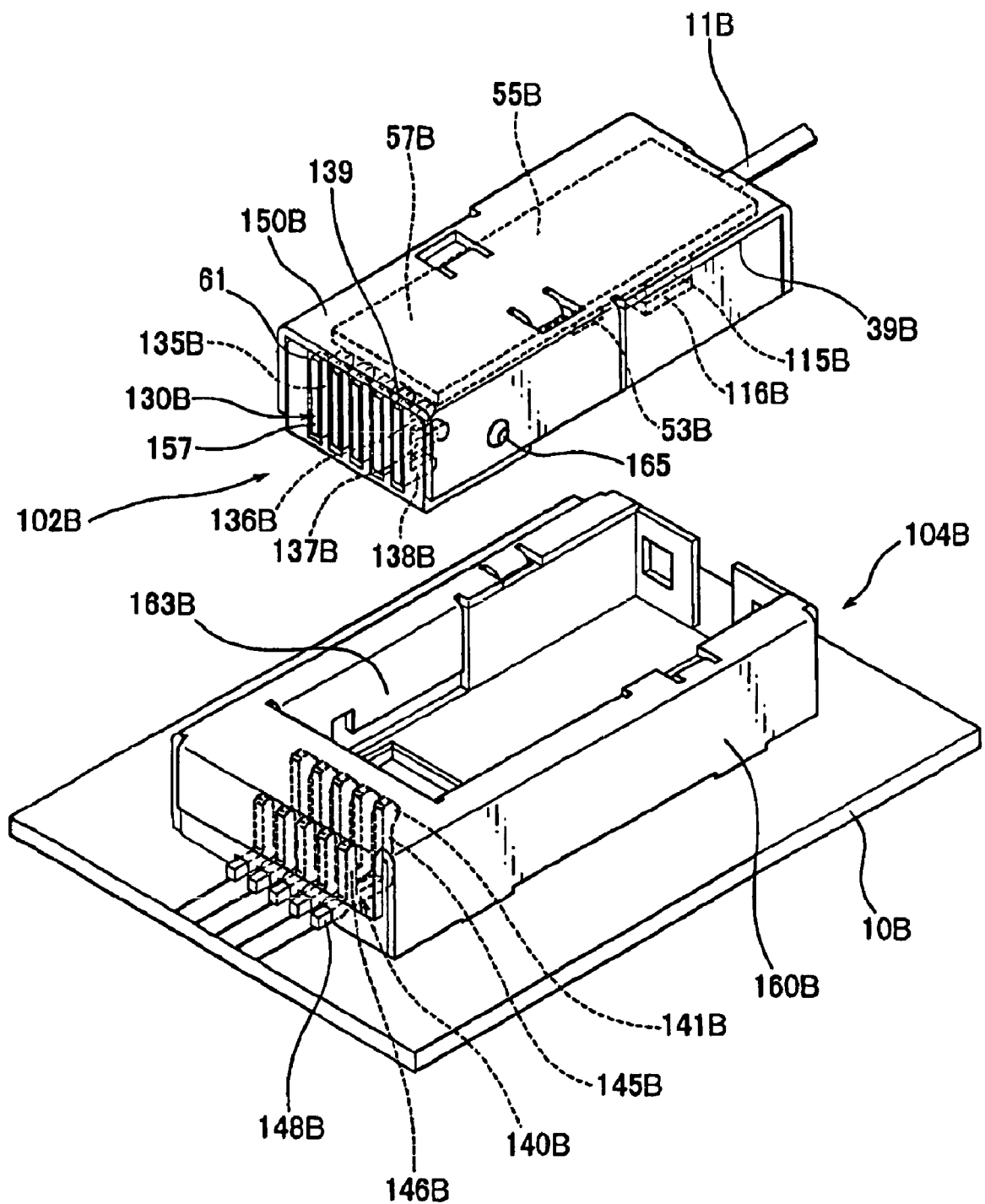
FIG. 21 shows an example of an application of the electro-optical composite connector.

FIG. 21 shows an application of the present invention. In the application, the features of the invention are applied to the conventional configuration illustrated in FIGS. 22 and 23. Accordingly, the basic configuration of the connector is similar to the conventional connectors illustrated in FIGS. 22 and 23. The features of the invention illustrated in FIGS. 1 to 10 (and FIGS. 11 to 20) are added. For the explanation purpose, components in FIG. 21 similar to those in FIGS. 1 to 20, 22 and 23 are denoted with same reference numerals with "B".

Figure 23:
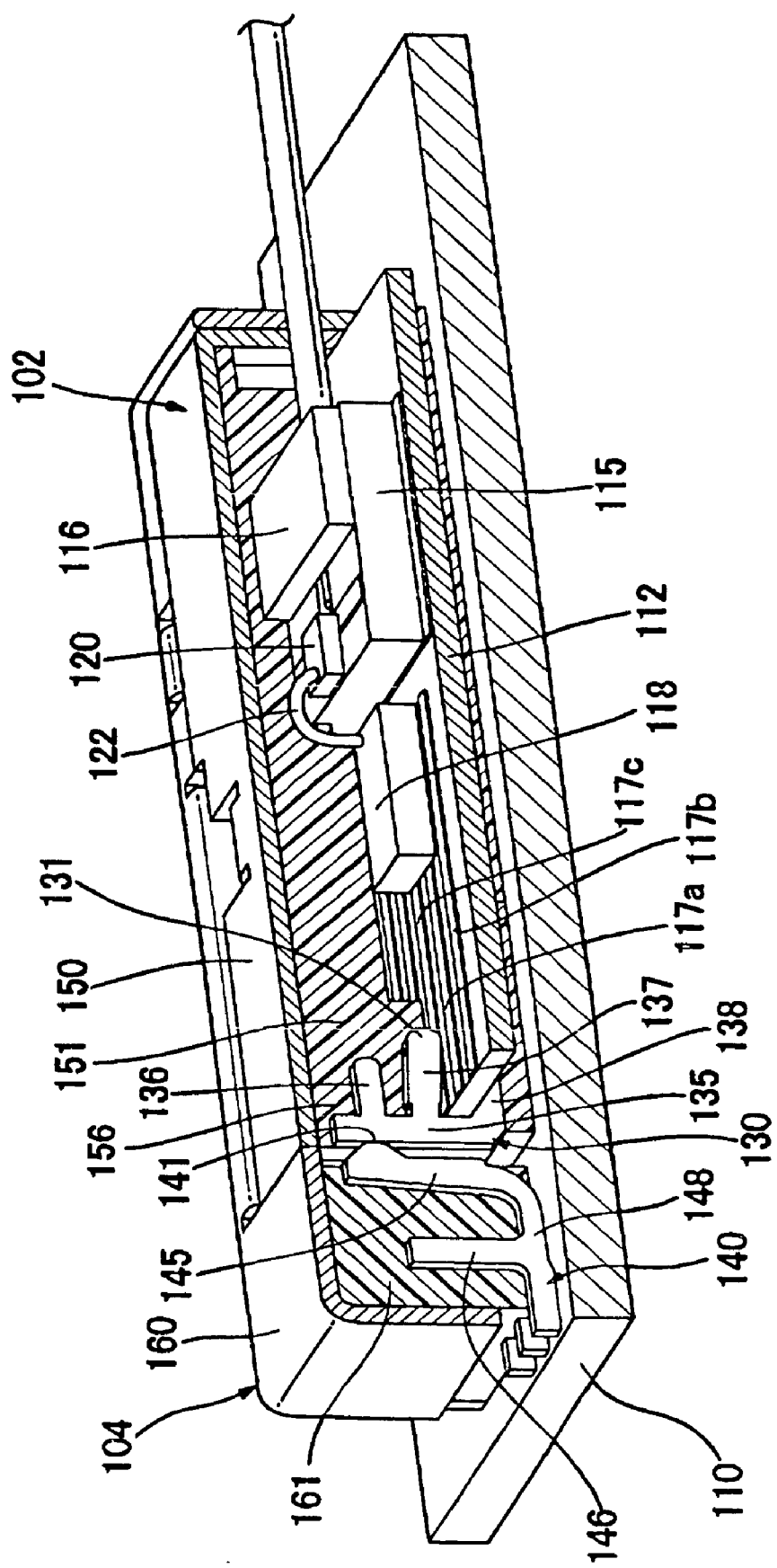
FIG. 23 is a perspective sectional view of the conventional electro-optical composite connector after fitting.

As shown in FIG. 21, in order to add the features of the invention, the module board 57B of FIGS. 1 to 10 is used in place of the optical module board 112 of FIG. 23. Upper ends 139 of plug terminals 130B shown in FIG. 21 are arranged vertically and embedded in the grooves 61 in the surface (one surface) of the module board 57B. The module board 57B is arranged so that the grounding surface 55B face upward, and the grounding surface 55B is disposed close to or to tightly contact with the inner wall 39B of the upper board of the plug shell 150B, and electrically contacts thereto.

Figure 22:
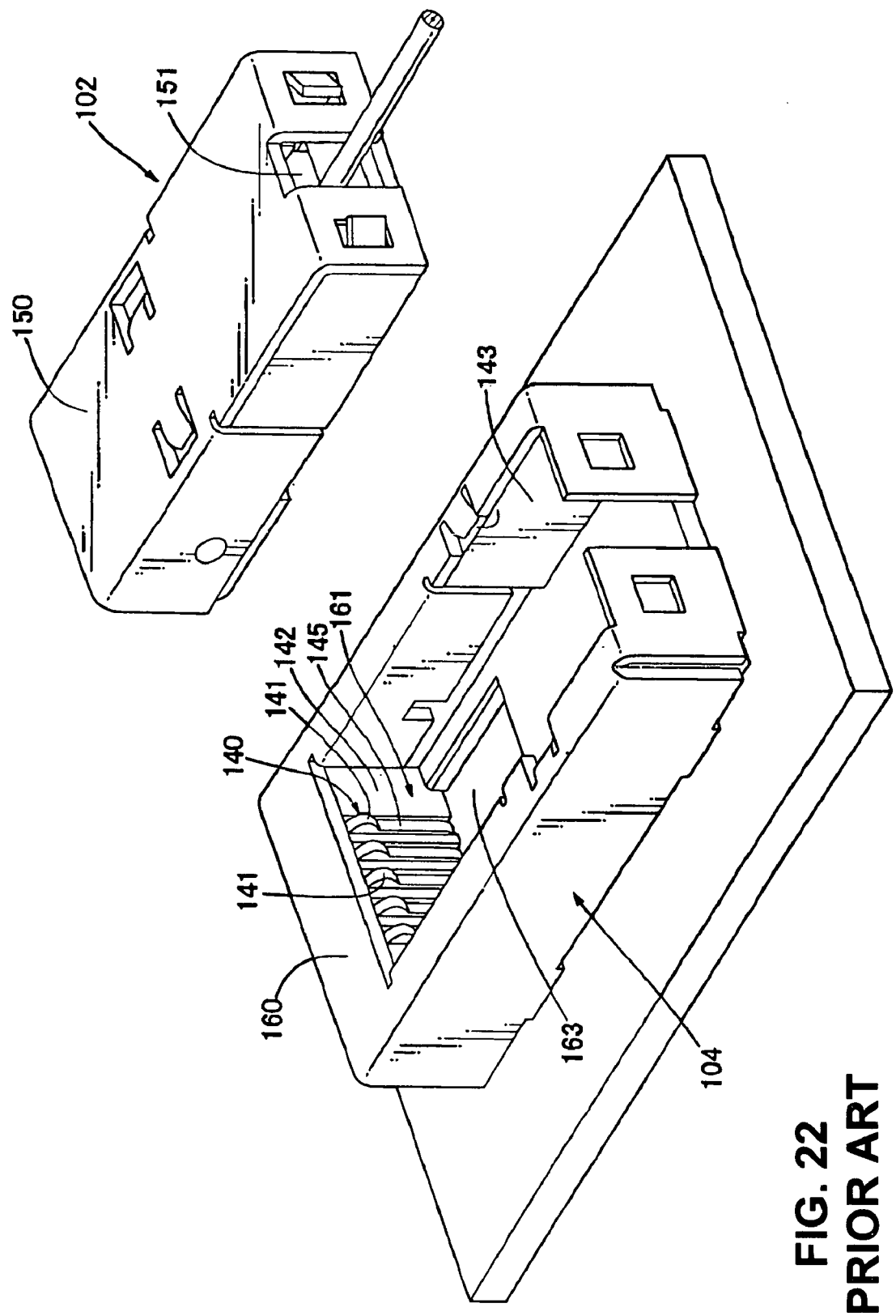
FIG. 22 is a perspective view showing a plug connector and a receptacle connector of a conventional electro-optical composite connector before fitting to each other.

A method of contacting between the connector terminals 140B and the plug terminals 130B is the same as that shown in FIGS. 22 and 23. More specifically, the plug connector 102B fits to the fitting recess portion 163B of the receptacle connector 104B from above. At this time, the contact sections 145B of the receptacle connector 104B contacts with the side surfaces 157 of the plug terminals 150B of the plug connector 102B at the terminal contact points 141B.

The semi-spherical protrusions 165 on the side faces of the plug shell 150B of the plug connector 102B maintain the fitting of the plug connector 102B in the receptacle connector 104B, and the receptacle connector 104B has concave sections (not illustrated) for receiving the semi-spherical protrusions 165.

The electro-optical composite connector of the invention can have various uses for communications between various devices and locations, in which the communication is made between two devices, such as a main body and a display of a cellular mobile phone, and a main body and a display of a personal computer.

The disclosure of Japanese Patent Application No. 2006-157232, filed on Jun. 6, 2006, is incorporated in the application by reference.

What is claimed is:

1. An electro-optical composite connector to be mounted on a board, comprising:
   a receptacle connector including a receptacle housing to be mounted on a first board, a receptacle shell for covering the receptacle housing, and a receptacle terminal arranged on the receptacle housing; and
   a plug connector including a plug housing for holding an optical fiber, a plug shell for covering the plug housing, and an optical module to be connected to the optical fiber,
   wherein said optical module includes a second board, a light receiving/emitting element mounted on one surface of the second board, at least one of a plug terminal and a land mounted on the one surface of the second board for transmitting a signal relative to the receptacle terminal; and a grounding surface formed on the other surface of the second board opposite to the one surface, and
   said grounding surface is electrically connected to an inner wall of the plug shell.

2. The electro-optical composite connector according to claim 1, wherein said receptacle terminal is arranged to connect to the plug terminal through compression.

3. An electro-optical composite connector to be mounted on a board, comprising:
   a receptacle connector to be mounted on a motherboard at one surface thereof and including a receptacle housing, a receptacle shell for covering the receptacle housing, and a receptacle terminal arranged on the receptacle housing; and
   a plug connector including a plug housing for holding an optical fiber; a plug shell for covering the plug housing; and an optical module to be connected to the optical fiber,
   wherein said optical module includes a module board and a component mounted on one surface of the module board,
   said module board includes a grounding surface on the other surface thereof opposite to the one surface for electrically connecting to the plug shell,
   said component includes a light receiving/emitting element for receiving an optical signal from the optical fiber and converting the optical signal to an electrical signal, or for receiving an electrical signal and converting the electrical signal to an optical signal, and
   said component further includes a wiring disposed on the module board for transmitting the electric signal converted by the light receiving/emitting element to the receptacle terminal or transmitting the electric signal from the receptacle terminal to the light receiving/emitting element when the plug connector fits to the receptacle connector.

4. The electro-optical composite connector according to claim 3, wherein said plug shell includes a fitting recess portion for covering the receptacle connector except the one surface thereof when the plug connector fits to the receptacle connector.

5. The electro-optical composite connector according to claim 4, wherein said wiring is disposed in the fitting recess portion in an exposed state so that the wiring contacts with the receptacle terminal through compression when the plug connector fits to the receptacle connector.

6. The electro-optical composite connector according to claim 3, wherein said wiring is arranged on the one surface of the module board at a front-half part thereof, and the light receiving/emitting element is arranged on the one surface of the module board at a rear-half part thereof.

7. The electro-optical composite connector according to claim 4, wherein said plug shell further includes a front section including the fitting recess portion, a rear section for protecting the light receiving/emitting element, and an inner bent section disposed on a bottom board of the plug shell for partitioning the front section and the rear section.

8. The electro-optical composite connector according to claim 7, wherein said fitting recess portion is formed of the one surface of the module board, a front inner surface of the plug shell, an outer surface of the inner bent section, and left and right inner surfaces of the plug shell.

9. The electro-optical composite connector according to claim 8, wherein said receptacle shell includes a rear-face contact section for contacting with the front inner surface of the plug shell and a contact arm for contacting with the outer surface of the inner bent section when the plug connector fits to the receptacle connector.

10. The electro-optical composite connector according to claim 9, wherein said contact arm includes two contact portions having facing areas bent outward.

11. The electro-optical composite connector according to claim 3, wherein said plug shell includes cut-out tongues in left and right side surfaces thereof for positioning the module board in a vertical direction, said cut-out tongues being bent inward at a same height level and away from an inner wall of the plug shell by a specified distance.

12. The electro-optical composite connector according to claim 11, wherein said cut-out tongues are arranged to form a space with upper edges thereof and the inner wall of the plug shell so that the module board is inserted into the space with the grounding surface thereof facing upward in a state that the grounding surface is situated close to or contacts electrically with the inner wall of the plug shell.

13. The electro-optical composite connector according to claim 3, wherein said plug shell includes a spring contact leg formed in an upper board thereof, said spring contact leg being bent downward to contact with the grounding surface.

14. The electro-optical composite connector according to claim 3, wherein said plug shell includes a front cut-out tongue and a rear cut-out tongue both formed in an upper board thereof, said front cut-out tongue being bent downward so that a rear edge thereof hits a front edge of the module board to restrict the module board from moving frontward, said rear cut-out tongue being bent downward so that a front edge thereof hits a rear edge of the module board to restrict the module board from moving backward.

15. The electro-optical composite connector according to claim 3, wherein said receptacle shell includes an elastic arm having a first locking mechanism at a distal end thereof, said first locking mechanism being arranged to engage a second locking mechanism disposed in the plug shell when the plug connector fits to the receptacle connector.

16. The electro-optical composite connector according to claim 3, wherein said receptacle terminal includes a compression terminal.

* * * * *